Aug. 4, 1942.   E. G. R. ALLRING   2,291,782

JOINING MEANS FOR BUILDING ELEMENTS

Filed July 16, 1940

INVENTOR.
Eric Gideon Rudolf Allring.
BY
ATTORNEY.

Patented Aug. 4, 1942

2,291,782

UNITED STATES PATENT OFFICE 2,291,782

JOINING MEANS FOR BUILDING ELEMENTS

Eric Gideon Rudolf Allring, Fagelfors, Sweden

Application July 16, 1940, Serial No. 345,813
In Sweden March 13, 1940

1 Claim. (Cl. 20—92)

The present invention relates to means for fixing two building elements to one another, and the means is particularly adapted for joining comparatively large elements, such as those occurring in factory-made buildings. Moreover, the means may preferably also be used in other spheres of work, as for example, for joining pontoons.

Known methods for joining building elements together entail many drawbacks. Such methods are difficult to carry out on the place of work. The joint made under known methods is of such a nature that when the joint is to be severed, this can only be done with great difficulty. If common hook members are used it is very difficult to press the elements together in an effective manner. Moreover, these hook members have the disadvantage in that they are easily thrown out of engagement with the means by which they are joined.

These and other disadvantages are eliminated by the joining means made in accordance with the present invention which is substantially characterized by the fact that a hook member having projections or the like on the inside and adapted to be pivoted to one building element is so shaped that a substantially round member, which is pivoted to the other building element and provided with projections, when rotated engages the hook member, the axis of rotation of which, together with the first-mentioned building element, is moved in a direction toward the axis of rotation of said member and the last-mentioned building element so that the two building elements will be pressed together; this resulting from the cooperation between the hook member and the substantially round member.

An embodiment of the joining means according to the invention is illustrated in the accompanying drawing, in which.

Figure 1:
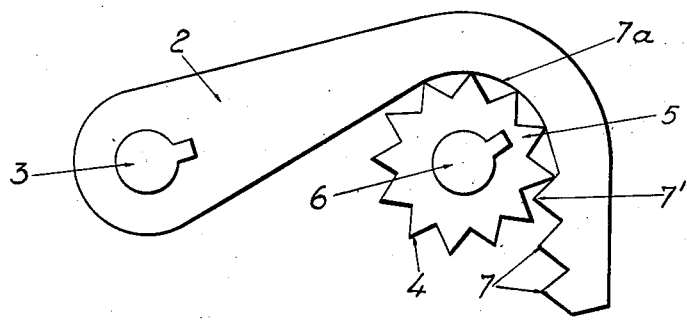
Fig. 1 shows a side elevational view of the elements of the joining means in their joining position.
Figure 2:
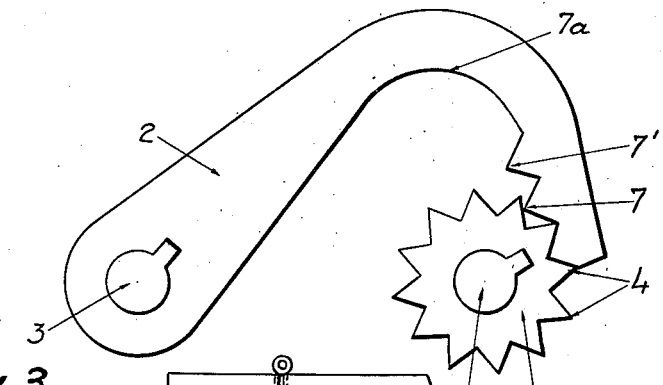
Fig. 2 is a side elevational view of said means in the initial position of the joining operation.

The joining means carried out in accordance with the invention comprises a hook member 2 arranged for displacement with (but not rotatably mounted on) a shaft 3, and a toothed member 5 provided with projections or the like 4, said toothed member being displaceable with (but not rotatably mounted on) a shaft 6. The inside of the outer portion of the hook member 2 is provided with teeth, projections or the like 7. The hook member 2 is provided with an inbent portion 7a of such a size that a line drawn through the centre of each of the two shafts falls inside the innermost tooth 7 of the hook member when the member joint has been tightened. In this position a projection of the toothed member will contact said innermost tooth 7' on the hook member.

Figure 3:
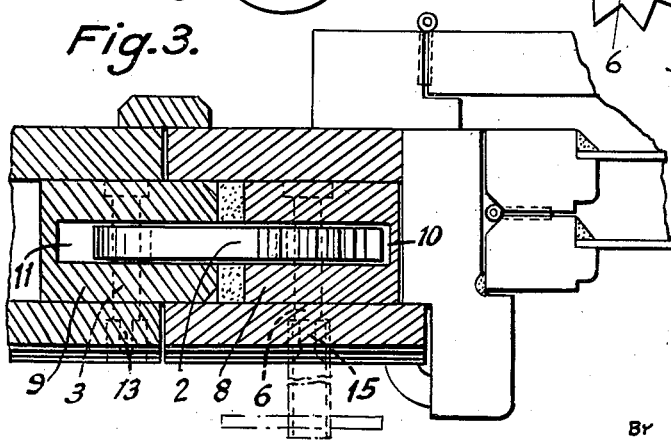
Fig. 3 shows a top plan view, partly in section of the means holding together two building elements.

Fig. 3 shows the joining means provided with two building elements, one of which, for example, is a standard 8 and the other a building plate 9, or the like. In each of said elements there is made a groove or notch 10, 11. In the groove 11 the hook member 2 is swingable with (but not rotatably mounted on) the shaft 3. The shaft 3 which, however, is rotatable in the building element, has a non-arcuate extension 13, protruding outside the wood. By turning a key (not shown) engaging this extension, the shaft 3 with the hook member 2 may be swung to and fro in the groove 11. In the groove 10 the toothed member 5 is displaceable with (but not rotatably mounted on) the shaft 6 which is arranged on a level with the shaft 12. The shaft 6 is rotatably mounted in the building element 8 and has a non-arcuate extension 15 protruding outside the wood. By a key (shown in dashed lines) said extension may be actuated so as to rotate the toothed member 5. In the embodiment shown the teeth 4 of the toothed member 5 will engage the teeth 7 so that the hook member is being forced downward to such an extent that the toothed member 4 will be situated in the inbent portion 7a of the hook. In this position one of the teeth 4 of the toothed member 5 supports against the tooth 7' of the hook member 2, said teeth lying at the end of the straight line passing through the centre of each of the shafts 3 and 6 so that the hook member will be locked in this position.

Having now described my invention, what I claim as new and desire to secure by Letters Patent is:

Means for coupling two building elements together comprising a hook member provided with projections at the end portion of its inner face and with a smooth and curved portion extending from said end portion, said hook member being pivoted on one of said building elements, and a member rotatably mounted on the other of said building elements and provided with peripheral teeth, the toothed member meshing with said hook member projections upon engagement of said hook member with said toothed member whereby both building elements will be pressed together so that in the joined position thereof said curved portion of the hook member will embrace substantially one half of said toothed member and a straight line drawn through the axes of rotation of both said toothed member and said hook member will fall inside the innermost of the projections of said hook member against which one of the teeth of the toothed member comes to lie.

ERIC GIDEON RUDOLF ALLRING.